United States Patent [19]
Falco

[11] Patent Number: 5,133,519
[45] Date of Patent: Jul. 28, 1992

[54] DRAG REDUCTION METHOD AND SURFACE

[75] Inventor: Robert E. Falco, East Lansing, Mich.

[73] Assignee: Board of Trustees operating Michigan State University, East Lansing, Mich.

[21] Appl. No.: 341,565

[22] Filed: Apr. 21, 1989

[51] Int. Cl.$^5$ .............................................. B64C 21/10
[52] U.S. Cl. ................................... 244/200; 244/130; 244/203
[58] Field of Search ............... 244/199, 200, 203, 198, 244/130

[56] References Cited

U.S. PATENT DOCUMENTS

| | | | |
|---|---|---|---|
| 1,846,328 | 2/1932 | Hampton | 244/198 |
| 2,267,927 | 12/1941 | Kightlinger | 244/200 |
| 2,959,377 | 11/1960 | Kaplan | 244/198 |
| 3,974,986 | 8/1976 | Johnstone | 244/199 |
| 4,664,345 | 5/1987 | Lurz . | |
| 4,706,910 | 11/1987 | Walsh et al. . | |
| 4,750,693 | 6/1988 | Löbert et al. | 244/200 |
| 4,865,271 | 9/1989 | Savill | 244/200 |

FOREIGN PATENT DOCUMENTS

| | | | |
|---|---|---|---|
| 0205289 | 12/1989 | European Pat. Off. | 244/200 |
| 104114 | 2/1917 | United Kingdom | 244/200 |
| 192568 | 2/1923 | United Kingdom | 244/200 |
| 2210011 | 6/1989 | United Kingdom | 244/200 |

OTHER PUBLICATIONS

Walsh, AIAA 20th Aerospace Sci. Meeting, AIAA-0169, NASA Langley Research Center, Hampton, Va., Jan. 11-14, 1982.

Walsh, et al., AIAA 6th Applied Aerodynamics Conference, AIAA-88-2554, NASA Langley Research Center, Hampton, Va. Jun. 6-8, 1988.

Primary Examiner—Joseph F. Peters, Jr.
Assistant Examiner—Anne E. Bidwell
Attorney, Agent, or Firm—Ian C. McLeod

[57] ABSTRACT

Rearward facing microsteps (11, 12, 20, 21) are provided in a wall surface (10, 10a, 10b, 19, 19a, 19b) to reduce shear friction drag caused by wall surface bounded turbulent shear flows. Microsteps combined with phased tangential flow injection adjacent the microsteps are also described. These reduce the drag caused by eddy currents. The surface is useful in any setting where turbulent flow occurs to create eddy currents such as airplanes, boats, vehicles, conduits and the like.

21 Claims, 6 Drawing Sheets

DRAG REDUCTION METHOD AND SURFACE

BACKGROUND OF THE INVENTION

1. Field of the Invention

The present invention relates to a drag reduction surface and method whereby skin friction drag caused by wall surface bounded turbulent shear flows is reduced. In particular, the present invention relates to the use of rearward facing microsteps with and without intermittent phased tangential blowing to reduce the drag.

2. Prior Art

The prior art has shown the use of riblets in the surface and lebus (raised air foils across the flow) in the outer region of the boundary layer to be effective in reducing drag. Such devices are described in Walsh, M. J., AIAA 20th Aerospace Sciences Meeting, AIAA-82-0169, NASA Langley Research Center, Hampton, Va., Jan. 11–14, 1982; Bechert, D. W., et al, Short report on measurements with sawtooth riblets (3M plastic riblet film), DFVLR, Mueller-Breslau-Str. 8, 1000 Berlin-West 12, F.R.G. (1988); and Walsh, Michael J., et al. AIAA 6th Applied Aerodynamics Conference, AIAA-88-2554, NASA Langley Research Center, Hampton, -Virginia Jun. 6–8, 1988), and U.S. Pat. No. 4,706,910 to Walsh et al. U.S. Pat. No. 4,664,345 to Lurz shows the use of a single step. This patent does not provide the steps in an organized manner to control the surface bounded turbulent shear flows of a fluid. These surface modification devices are effective and can be used in the present invention.

Steps have been used for many years on boats and the like to reduce drag. These steps have heights which are well beyond the sublayer region adjacent to the wall surface.

OBJECTS

It is therefore an object of the present invention to provide a drag reduction surface which can be used alone or with the riblets or other devices of the prior art. Further, it is an object of the present invention to provide a drag reduction surface which is simple and economical to construct and maintain. These and other objects will become increasingly apparent by reference to the following description and the drawings.

IN THE DRAWINGS

FIG. 1 is an enlarged front perspective and cross-sectioned view of the microsteps 11 and 12 on a surface 10 which provide the drag reduction in a passive manner for a fluid A passing over the surface as shown by the arrows.

Figure 4:
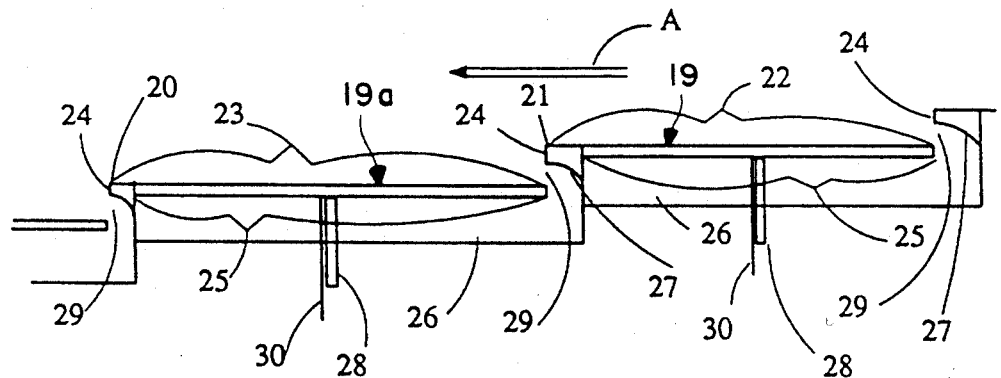

FIG. 4 is a front cross-sectional view of microsteps 20 and 21 in a surface 19 which have a means for injecting the fluid A' through a passage 27 along a downstream shoulder 23 below the face 24 of step 21.

Figure 5:
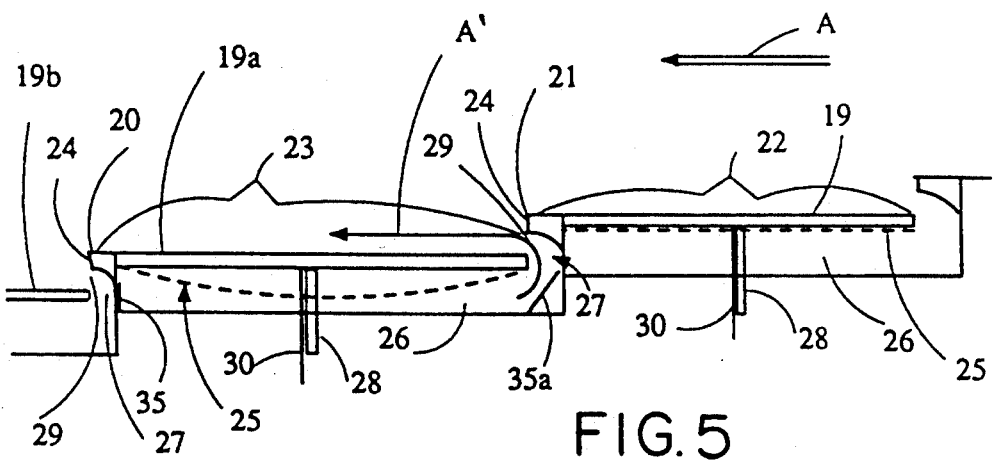

FIG. 5 is a front cross-sectional view showing an activator 25 expanded into a cavity 26 to inject the fluid A' through the opening 27.

Figure 6:
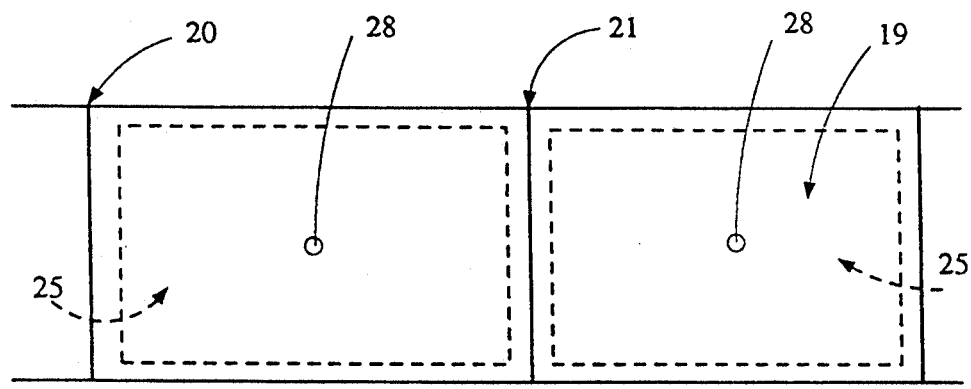

FIG. 6 is a plan view of FIG. 4.

Figure 7:
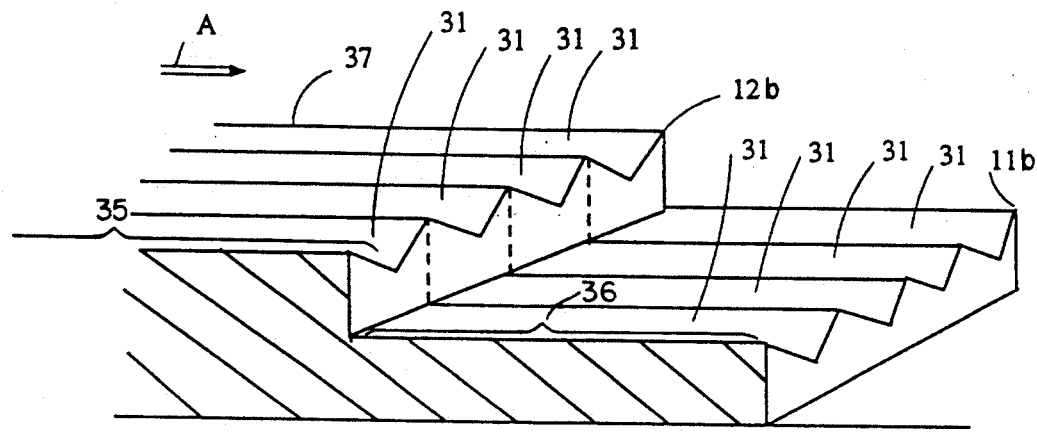
Figure 8:
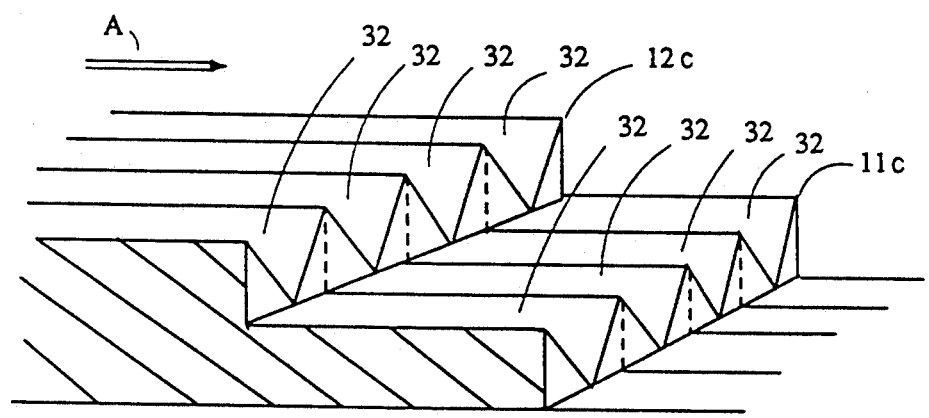
Figure 9:
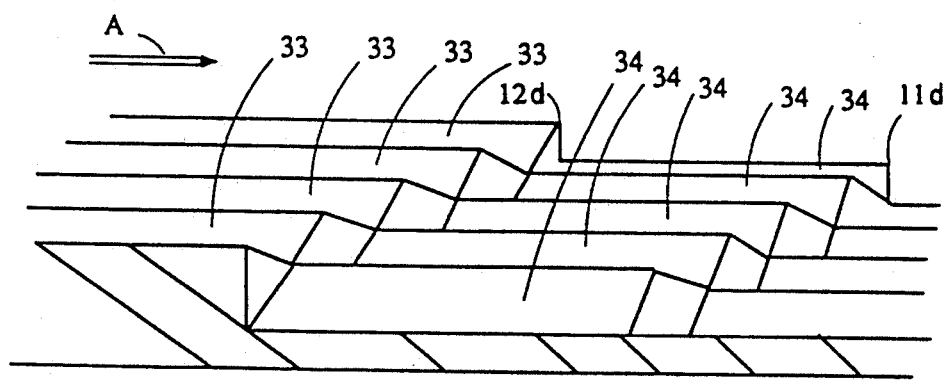

FIGS. 7 to 9 are enlarged perspective views of the microsteps 11b, 11c, 11d, 12b, 12c and 12d with three possible arrangements of riblets 31, 32 or 33 and 34 covering them. FIG. 7 shows riblet 31 crests of one-half step height with crest and valleys in phase on each successive step. FIG. 8 illustrates riblets 32 with a height equal to the step height, crests and valleys in phase. FIG. 9 shows a similar example of riblets 33 and 34 with crests out of phase on successive steps.

Figure 2:
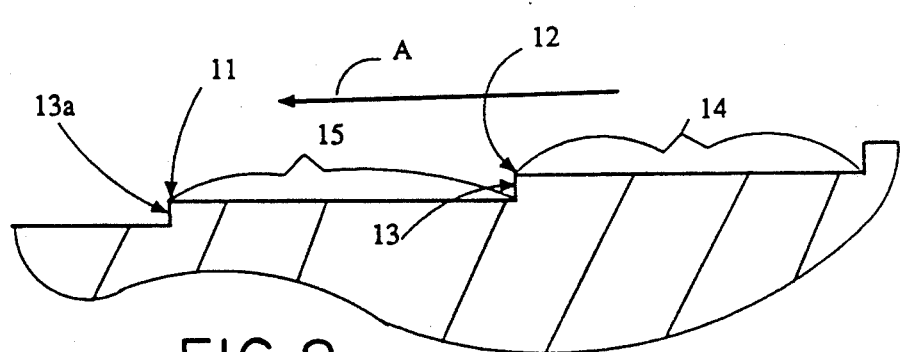
FIG. 2 is a front cross-sectional view of FIG. 1 along line 2—2.
Figure 10:
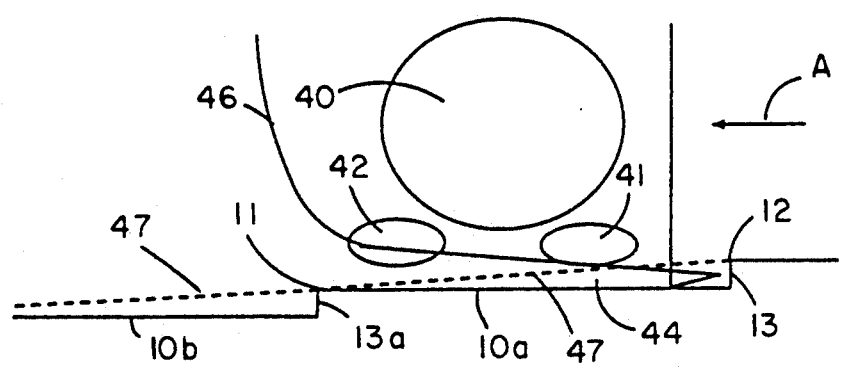
Figure 10:
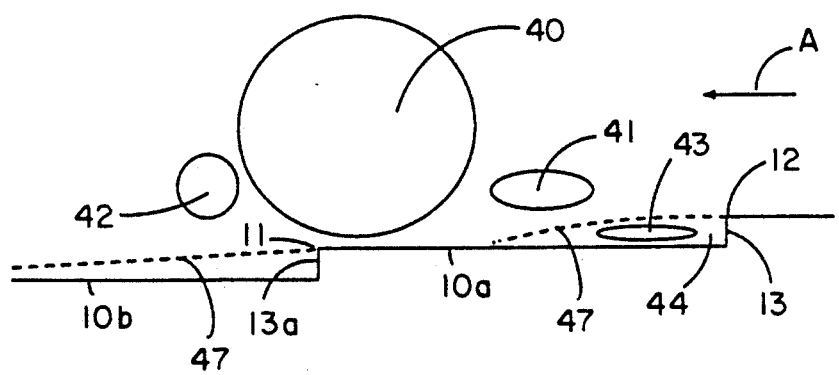
Figure 10:
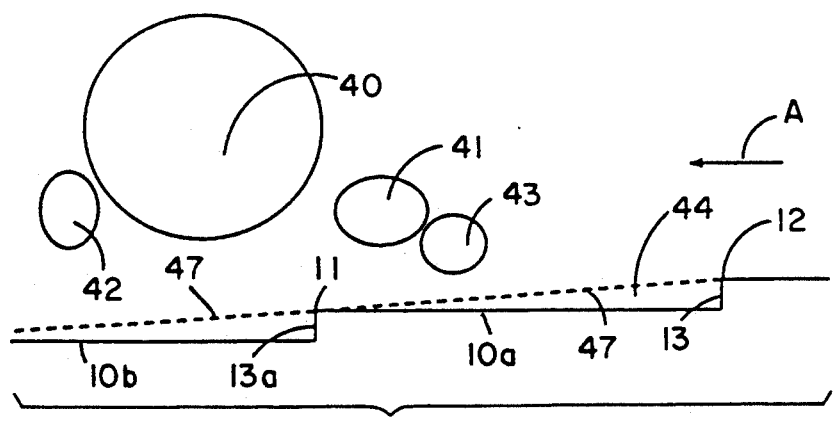

FIG. 10 is a front cross-sectional view as shown in FIG. 2 showing the eddy current 40 in phases as it moves over the microsteps 12 and then 11.

Figure 10A:
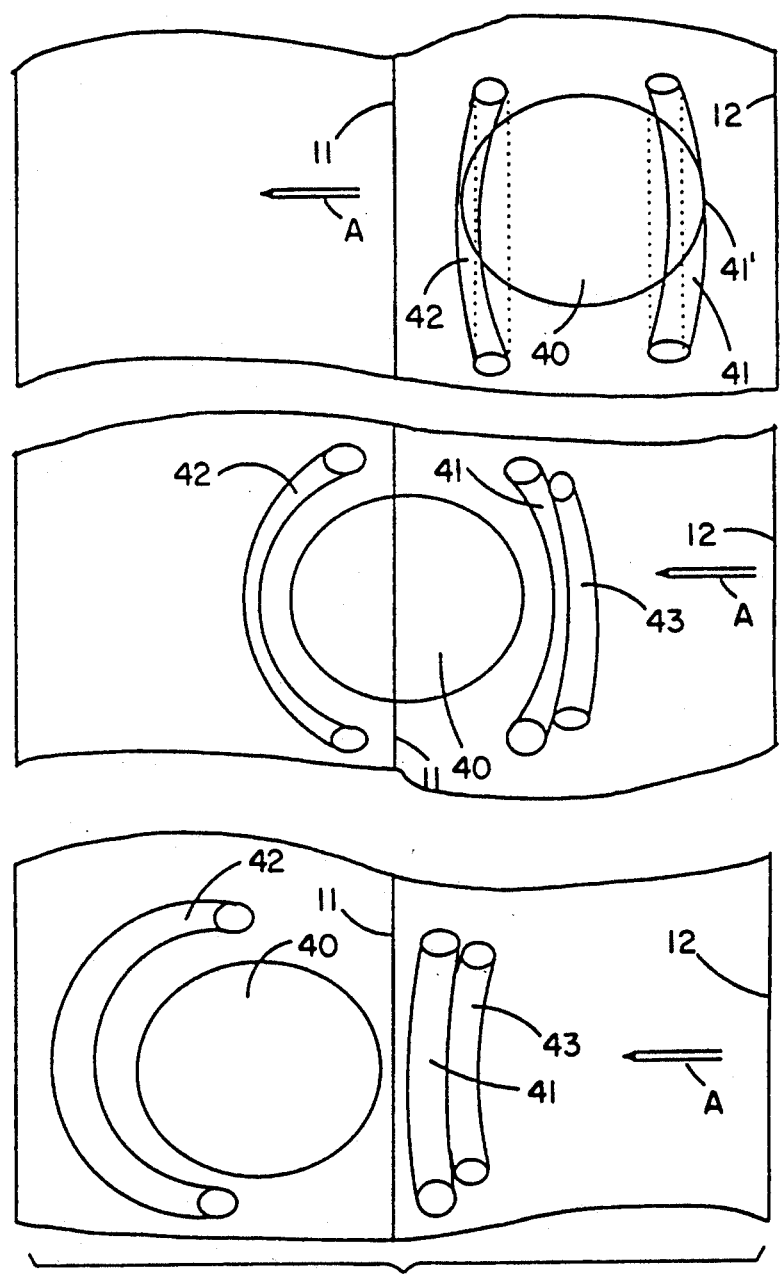

FIG. 10a is a plan view of the eddy currents as shown in FIG. 10.

Figure 11:
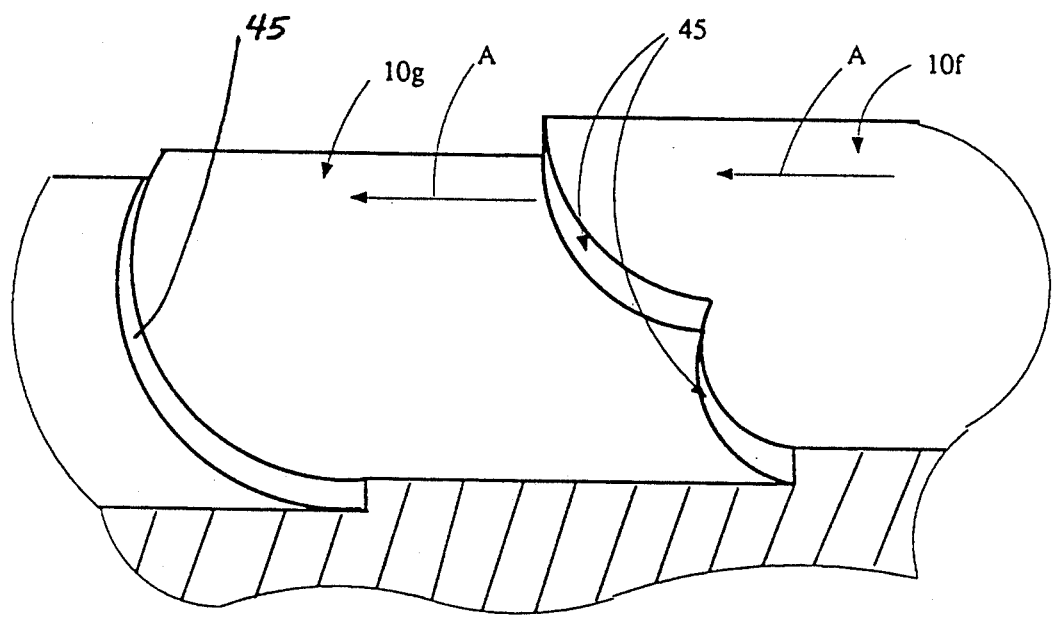

FIG. 11 is a perspective front view of scallop 45 between surfaces 10g and 10f.

GENERAL DESCRIPTION

The present invention relates to a device which reduces skin friction drag caused by wall surface bounded turbulent shear flows of a fluid by controlling the flow characteristics within the wall surface bounded shear flows through interference with eddy current formation and interactions near the wall surface which comprises microsteps with a downstream facing face in the surface oriented across a mean flow direction along the wall surface and stepped down in the mean flow direction to thereby reduce drag.

The present invention also relates to a method which comprises: providing a device which reduces skin friction drag caused by wall surface bounded turbulent shear flows of a fluid by controlling the flow characteristics within the wall surface bounded shear flows through interference with eddy current formation and interactions near the wall surface which comprises microsteps with a downstream facing face in the surface oriented across a mean flow direction along the wall surface and stepped down in the mean flow direction; and flowing the fluid over the surface in the mean flow direction wherein the microsteps reduce the drag.

The microstep can be passive or active. In their active form fluid is injected into specific flow features, particularly the eddy currents, after they flow over the step.

The phrase "wall surface bounded turbulent shear flow on a wall surface" includes a turbulent or transitional boundary layer on an unconfined surface, such as the airfoil of a wing. The phrase also includes turbulent or transitional flow in an enclosed space, such as a pipe or duct. In each instance eddy currents are formed which increase drag.

The word "microstep" means a step on a wall surface which is a fraction of the thickness of the wall bounded turbulent shear flow and scales on wall variables. As will be appreciated, this thickness varies depending upon the velocity of the fluid flow over the wall surface and the viscosity of the fluid. Typically the microstep has a face which forms a sharp edge with the upstream surface, that is, it is at an angle to the upstream and downstream shoulders of the wall surface on either side of the face. The edge can be serrated. The surface can also have riblets along the shoulders of the steps in the flow path of the fluid. The phrase "new turbulence" refers to turbulence produced after the initial turbulence when the fluid begins to flow over the surface.

SPECIFIC DESCRIPTION

Figure 1:
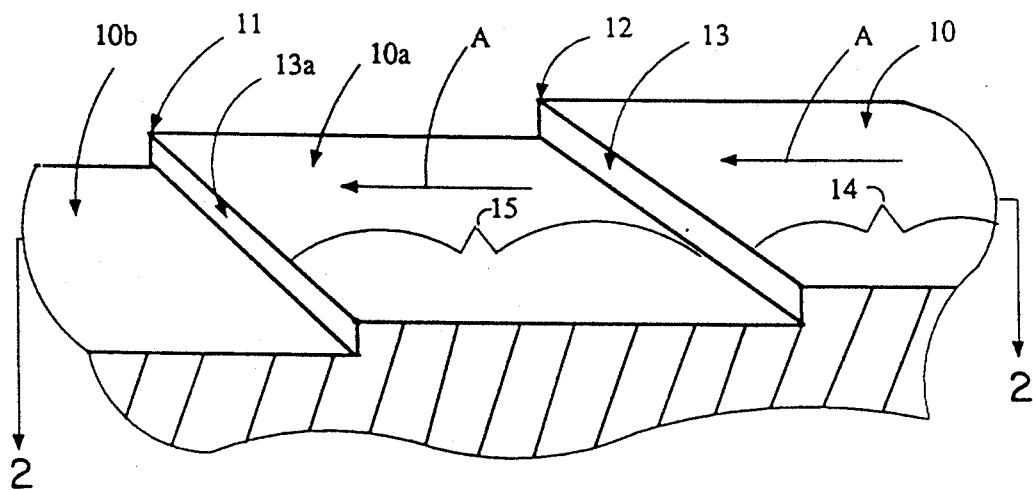
Figure 3:
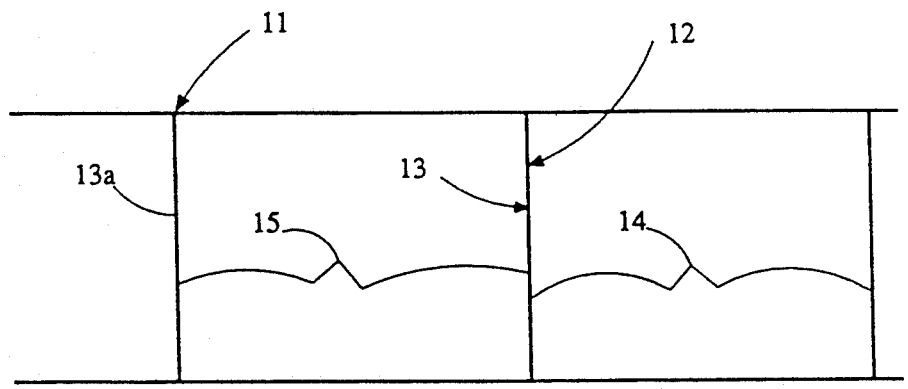
FIG. 3 is a plan view of FIG. 1.

The invention is intended to reduce the drag that develops on a wall surface as a fluid in turbulent motion flows over the wall surface. The wall surface would, for example, be used as a coating or outer layer on the skin of an airplane wing or of a plane's fuselage, the hull of a ship or submarine, the inside surface of a pipe, etc. The invention can take two forms, either a passive form as shown in FIGS. 1 to 3 or an active form as shown in FIGS. 4 to 6. In its active form as shown in FIGS. 4 to 6, the invention applies an additional force which further reduces the drag on the wall surface. The surface can also have riblets as shown in FIGS. 7 to 9.

In the passive mode as shown in FIGS. 1 to 3, the invention consists of multiple rearward facing microsteps 11 and 12 in the wall surfaces 10, 10a and 10b. The microsteps 11 and 12 have a rearward facing face 13. These microsteps 11 and 12 are scaled with the viscous length scale, which is formed by dividing the kinematic viscosity by the wall friction factor, i.e., $\nu/u_\tau$. So called "wall variables" are $\nu/u_\tau$ for the length scale, and $u_\tau$ for the velocity scale. From these two scales a time scale, $\nu/u_\tau^2$, can be formed. The shape of the surfaces 10, 10a and 10b scaled this way has a weak dependence on the Reynolds number of the boundary layer that exists over the surface 10, 10a and 10b. An appropriate definition of the Reynolds number is based on the momentum thickness, $\theta$, of the boundary layer, the speed of the flow outside of the boundary layer, $U_o$, and $\nu$, as $R_\theta = U_o \theta / \nu$. The range of Reynolds numbers for application of invention is very large, from the lowest $R_\theta$ at which a turbulent boundary layer forms represented by approximately 300 to the highest (a current technological ball-park number might be $10^9$). The vertical height (h) of the steps 11 and 12 from the surfaces 10a to 10 or 10b to 10a should be in the range of 5 wall length scales, i.e. $\nu/u_\tau \approx 5$ preferably between about 2 and 20 wall length scales, and the length (d) of the shoulders 14 and 15 between the microsteps 11 and 12 approximately $\nu/u_\tau = 20$ —200, at $R_\theta$ in the range of $300 < R_\theta < 10{,}000$. At higher Reynolds numbers both the step 11 or 12 height and length will increase in wall units.

Since details of many of the high Reynolds number flows are only vaguely known, the ranges of the microstep 11 and 12 length to step height will vary, but with the idea of enabling a separated region to exist over most of the surfaces 10, 10a and 10b. Furthermore, optimization at a given Reynolds number will be needed, and will depend upon pressure gradient and surface curvature, etc. In physical size however, microstep 11 and 12 height will decrease as the Reynolds number increases. Assuming the scale of $h^+ = 5$ and $d^+ = 100$ in wall length scales for a commercial airliner such as a Boeing 747 at cruise (where the speed is about 675 mph), this would result in h = 0.0015 mm, and d = 0.03 mm, while for a natural gas pipe line h = 0.75 mm and d = 15 mm (where the fluid velocity is about 2 meters per second).

Figure 2A:
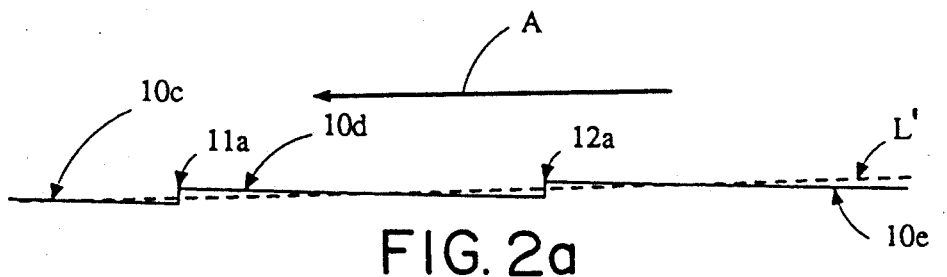
FIG. 2a illustrates surfaces which are straight, at an angle or curved showing where the surface would be if it were smooth, by dotted lines.

The orientation for usage of the invention would depend upon the geometry of the application. In general, the steps 11 and 12 would be arranged so as to take on the average contour that the surface 10, 10a and 10b would have been given if it were smooth. For example, on a flat surface which is parallel to the flow, such as a pipe line, the surfaces 10c, 10d and 10e are as shown in FIG. 2a, with a mean flow path L' shown by the dotted line. Because of the small size of the steps the curvature of a flow surface in the flow direction would not be apparent in FIG. 2a.

The overall details of a specific flow geometry pressure gradient and Reynolds number where the microsteps are used can dictate other step height/shoulder length and orientations. The passive mode of operation of the invention can be implemented by adhering a vinyl or other plastic coating to an existing surface in a manner known to those skilled in the art.

In its active form, as shown in FIGS. 4 to 6, microsteps 20 and 21 are provided with shoulders 22 and 23. In response to detailed pressure pulses of the flow, impulsive jets of fluid A' emanate from the rearward facing microsteps 20 and 21 through orifice 29. A step face 24 is provided which directs the fluid A' parallel to the surfaces 19 or 19a on shoulders 22 and 23. These jets A' are phased with the active parts of the motions in the turbulent or transitional boundary layer.

A sensor 28 under the shoulder 23, for instance, determines when the pressure on the shoulder 23 falls below a given amount, and triggers an actuator 25 which results in the production of an impulse of the fluid A' through opening 27. A rod 30 can be used to actuate the actuator 25 downward as shown by the dotted lines in FIG. 3. The duration of this impulse of fluid A' is determined by the speed of the fluid A flow, the response of the actuator 25, o and the volume of fluid A' stored in a cavity 26. In any case it need be no longer than the residence time of the pressure producing eddy, which is usually between about from four to ten wall time scales at moderate Reynolds numbers. The actuator 25 changes the volume of fluid in the cavity 26, thus increasing its pressure and forcing it out of the nozzle 27 whose exit is an orifice 29 in the rearward facing step 21. Under some circumstances it may be useful to have one sensor 28 govern the operation of a number of actuators 25 in a timed sequence.

The height and length of the microsteps are scaled with viscous units and both dimensions can be changed to tune the surface to the flow within the guidelines indicated above. The rearward facing step 13 and 13a and the shoulders 10, 10a, and 10b need not be flat surfaces. The optimum will depend upon the flow, for example, a slight convex curvature could be used. The specification of the sensors 28 and the actuators 25 of the active mode of this invention have a wide latitude. The flow situation will govern both. If we are considering a gas such as air, then the pressure sensor could be, for example, a piezoelectric device, and the actuator can be voice coil/membrane combination, electrostatic membrane or a stored energy membrane, or an electromagnetic fluid. If the fluid flow is in a liquid, the sensors 28 and actuators 25 are appropriate to that medium. Details of the nozzle 27 and the cavity 26 shape also are dependent on the flow conditions. Fabrication might be via a composite of photoetched layers.

The cavity 26 can also be refilled by drawing in fluid from downstream through step 20 using optional movable valving 35 and 35a where the further evolution of the eddy/wall interaction results in a liftup of fluid creating a high pressure on a shoulder of a step just downstream. This high pressure can be used to help refill the cavity 26 thus reducing the pressure on the downstream shoulder and thus weakening the burst of fluid occurring over that portion of the wall surface 19b.

In the passive version, shown in FIGS. 1 to 3, control of the buildup of fluid within the separated regions can be accomplished by choosing the length of the shoulders 14 and 15 of the microsteps 11 and 12 to be just short of the average length of the separated region. Another passive version of the invention is shown in FIGS. 7 to 9 has streamwise serrations 31, 32, 33 and 34 put into the steps 11b to 11d and 12b to 12d to enhance mixing after the separation. This allows more control of the size of the separated regions and control over the natural tendency of separated regions to entrain fluid, grow and intermittently eliminate some of their fluid. If the serrations 31 to 34 are extended along the shoulders 35 and 36 of the microsteps 11b and 12b, they are riblets 31, 32, 33 and 34 as shown in FIGS. 7 to 9. The relative height of the serrations or riblets 31 to 34 with respect to the microsteps 11b to 11d and 12b to 12d and the positioning of crests 37 of the ribs or serrations 31 to 34 will have to be determined by the flow of the fluid, but will fall within the above overall guidelines. FIGS. 7 to 9 show a range of designs. In another version of the invention, control of the size and growth of the separated region can be obtained by scalloped steps 45 between surfaces 10f and 10g of width approximately the same as the shoulder 14 or 15, so that the surface resembles the skin of a scaled fish, as shown in FIG. 11.

OPERATION

The microsteps of the present invention control the formation and amplification of spanwise vortices and vorticity in the so-called viscous sublayer region of the turbulent boundary layer which leads to the redistributions of momentum that creates drag on a surface.

Very considerably higher drag is produced by the turbulence in the boundary layer flowing over a surface, than is found if the flow were in a laminar state. However most technologically important flows are turbulent. Overall in a turbulent boundary layer, there are regions of fluid carrying energy and momentum that fluctuates about some average value. When these regions can be identified they are sometimes called eddy currents, sometimes coherent motions. When eddy currents produced in the turbulent flow convect over the wall, they push fluid away from their path because of the high local dynamic pressure associated with their motion. Different sized eddy currents create different magnitude pressure pulses with the strongest pressure pulses on the wall, coming from eddy currents of a scale called the Taylor microscale. These convecting pressure pulses act to most strongly redistribute the fluid that exists in the region just above the wall, called the viscous sublayer, although pressure pulses from eddy currents of all sizes have a similar but weaker effect. In this region, between $y^+ = 0$ and 10 wall length scales, the vorticity of the fluid is highest, and on average, the vorticity vectors are parallel to the wall and perpendicular to the flow. Considering a single eddy current, its convecting pressure pulse pushes the vorticity vectors associated with the sublayer fluid away from the region of highest pressure and towards the region of low pressure that forms between the wallward side of the eddy current and the wall. Thus, some are bent upstream, decelerated, and some downstream, accelerated. Once bent, the vorticity vectors that are decelerated act on themselves through a process known as vortex induction, to keep themselves close to the wall, in the region of slowest flow, and thus decelerate further. An additional effect is then also amplified. It is known in the trade as the "mirror image" effect, which is an essential response of fluid with organized vorticity to the impermeability of the wall. The image vorticity acts to further decelerate the initially decelerated vortical fluid. Thus this fluid is slowed down significantly more. Furthermore, the vorticity in the decelerated fluid is amplified because the fluid with high vorticity is stretched (the part of a vortex that is decelerated trails behind the rest at other spanwise locations) and, since mass and angular momentum is conserved, like an ice skater who brings in her arms, to conserve angular momentum the fluid rotation (proportional to the vorticity) must increase. Thus, the vortex induction effect increases and this decelerated fluid begins to move surrounding fluid transporting even more momentum, and thus creating more drag.

The present invention acts to interfere with this process, and hence reduce momentum transport and thus reduce the drag produced. The principle of operation of the invention used in the passive form is described first. The presence of the rearward facing steps 11 and 12 forces a separation of the flow of the fluid A which exists for the order of 7 step heights during times of high momentum transport to 20–30 step heights during times when only diffusion processes are active. FIGS. 10 and 10a are schematic views of the operation of the microsteps 11 and 12 as the turbulent flow proceeds over them as a function of time (flow is from right to left and time increases from top to bottom). The mean velocity variation as a function of position is indicated by 46. The extent of this separated region 47 is important. When the pressure pulse comes down and attempts to decelerate the fluid over the shoulder between microsteps 11 and 12, because of the presence of the separated region the effect is entirely different than if the flow was attached. First, the incipient decelerated vortex 41 is further away from the wall surface 10a, and thus the deceleration due to its image vortex is decreased. Furthermore, the region near the apex of the incipient decelerated vortex 41' organizes the reversed flow in the separated region into a vortex 43, and this real vortex, which is of much lower strength will be accelerated around the vortex 41 created in the mainstream flow. This process will result in the lift-up of both of the vortices. A two-fold benefit is achieved. First, the mainstream vortex is removed further from the wall surface 10a or 10b so that the inviscid "mirror image" deceleration is further reduced (it decreases linearly with distance from the wall), and second, the vortex is moved into a region of higher speed ambient fluid A, so that the vortex 41 is preferentially accelerated in the region o around 41' reducing vortex amplification. This can decrease or even eliminate entirely the deceleration effect of the eddy current.

In the passive mode of operation, the phasing of the position of minimum pressure due to the closest passage of the eddy current and the position of the microsteps 11 and 12 is essentially random. Thus, the extent of the separated region is important. It is known that the extent will depend on the nature of the disturbances in the oncoming flow as indicated above. It is known that the important disturbances occur between 25 and 250 wall time scales, so that if they travel at $0.8U_o$, they will be between 400 and 4000 wall length scales apart. Thus, for a large fraction of the time the flow will be relatively free from disturbances, with a long separated region, which means that the above separated flow interference mechanism will on average occur for the pressure pulses no matter where they occur on the shoulder of the microsteps 11 and 12 or region 14 or 15.

The active version of the present invention seeks to provide additional resources to interfere with the same physics. In the active mode, sensor senses the initial sharp decrease in pressure and actuator 25 produces an increment of streamwise momentum in the separated region o by forcing air (or other fluid A') through the rearward facing microstep 20 and/or 21 which is just upstream of the eddy/wall interaction. The added momentum counteracts the deceleration described above, and prevents the formation and/or amplification of the decelerated vortices 41. The fluid A' used is restored during the periods between the eddies that give the pressure pulses. There is ample time to slowly relax the cavity 26 actuator 28 and refill the cavity 26 during the non-critical times. This phased control is in addition to the passive control which exists when the active version is turned off. A detailed discussion of the dynamics of the turbulent boundary layers is discussed in correlation (Falco, R., AIAA 2nd Shear Flow Conference, AIAA 89-1026, Mar. 13-16, 1989)).

Examples of uses include airplane fuselages and wings, on ship hulls and submarine and torpedo hulls, pleasure craft, pipes, duct work, etc. Properly scaled rearward facing microstepped surfaces can be used to reduce viscous drag when the fluid flowing over the surface produces a turbulent or transitional boundary layer. The control can be applied passively, i.e. through the shape of the surface, or actively through a combination of the surface shape and the phased impulse of a micro jet of fluid in the main flow direction. The principle is to interfere with the redistribution and amplification of spanwise vorticity that exists near the wall. The natural redistribution of this vorticity results in its amplification and the formation of a burst of turbulence that creates drag.

The present invention provides the minimum course of action necessary to prevent amplification of the undesired physics in turbulent shear flows, without causing undesirable side effects. In the passive mode the microsteps provide a surface flow field disruption which, on average, reduces the amplification of the turbulence producing mechanics. The active mode, because it is phased to the event, can deterministically interfere with the process, but with the added disadvantage of the need for sensing and actuating means. To achieve maximum control, the active mode of operation of the invention is preferred.

It is intended that the foregoing description be only illustrative of the present invention and that the present invention be limited only by the hereinafter appended claims.

I claim:

1. A device which reduces skin friction drag caused by wall surface bounded turbulent shear flow of a fluid by controlling the flow characteristics within the wall surface bounded shear flow through interference with eddy current formation and interactions near the wall surface which comprises microsteps each with a downstream facing face in the surface oriented across a mean flow direction along the wall surface and stepped down in the mean flow direction, wherein the face of each of the microsteps has a height on the order of magnitude of a sublayer thickness, which is about 0.0015 mm or larger and has a length between the faces of the microsteps which is significantly longer than the height of each of the microsteps and 0.03 mm or larger so that the combination of the face height and the length reduce the shear friction drag of the fluid during flow of the fluid as compared to a smooth wall surface.

2. The device of claim 1 and wherein the faces of the microsteps have a spacing between them on the order of between about 20 to 200 sublayer thicknesses.

3. The device of claim 1 wherein the surface includes riblets in the mean flow direction of the fluid which aid in reducing the production of new turbulence in the bounded turbulent shear flow.

4. The device of claim 1 wherein the microsteps have an integral surface.

5. The device of claim 1 wherein at least an edge of the microstep in the flow of the fluid has serrations.

6. The device of claim 1 wherein the face of the microstep is scalloped.

7. The device of claim 1 wherein the serrations on the edge are provided by riblets along the wall surface in the mean flow direction.

8. The device of claim 1 wherein the height of the microsteps is between about 2 and 20 wall scales.

9. The device of claim 8 wherein the faces of the microsteps have an opening between them on the order of 20 to 200 sublayer thicknesses.

10. A method which comprises:
    (a) providing a device which reduces skin friction drag caused by wall surface bounded shear flow through interference with eddy current formation and interactions near the wall surface which comprises microsteps with a downstream facing face in the surface oriented across a mean flow direction along the wall surface and stepped down in the mean flow direction, wherein the face of each of the microsteps has a height on the order of magnitude of a sublayer thickness, which is about 0.0015 mm or larger and which has a length between the faces of the microsteps which is significantly longer than the height of the microstep and 0.03 mm or larger so that the combination of the face height and the length reduce the shear friction drag of the fluid during flow of the fluid as compared to a smooth wall surface; and
    (b) flowing the fluid over the surface in the mean flow direction wherein the microsteps reduce the drag.

11. The method of claim 10 wherein the wall surface includes riblets in the mean flow direction.

12. The method of claim 10 wherein a small amount of fluid is injected in the mean flow direction of the fluid downstream of at least one of the faces of the microsteps.

13. The method of claim 10 wherein at least an edge of the microstep in the flow of the fluid has serrations.

14. The method of claim 10 wherein the face of the microstep is scalloped.

15. The method of claim 10 wherein the height of the microsteps is between about 2 and 20 wall scales.

16. The device of claim 15 wherein the faces of the microsteps have an opening between them in the order of 20 to 200 sublayer thicknesses.

17. A device which reduces skin friction drag caused by wall surface bounded turbulent shear flow of a fluid by controlling the flow characteristics within the wall surface bounded shear flow through interference with eddy current formation and interactions near the wall surface which comprises microsteps with a downstream facing face in the surface oriented across a mean flow direction along the wall surface and stepped down in the mean flow direction to a shoulder downstream of each of the microsteps, wherein a portion of the wall surface adjacent to at least some of the microsteps is adapted to inject a small but sufficient amount of fluid primarily in the mean flow direction of the flow and wherein the injection is phased to the passage of pressure producing eddy currents just downstream of a point of injection of the fluid which eddy currents are detected by a detection means in the shoulder.

18. The device of claim 17 wherein the detection means is a pressure detection means.

19. A device which reduces skin friction drag caused by wall surface bounded turbulent shear flow of a fluid by controlling the flow characteristics within the wall surface bounded shear flow through interference with eddy current formation and interactions near the wall surface which comprises microsteps each with a downstream facing face in the surface oriented across a mean flow direction along the wall surface and stepped down in the mean flow direction, wherein an expandable means is movable into a cavity below the wall surface downstream of at least some of the microsteps to reduce the volume of the cavity so as to result in the injection of fluid in the cavity into the wall surface turbulent shear flow through an opening immediately adjacent to the face to interfere with the eddy currents and wherein the expansible means is later collapsed allowing the cavity to refill with the fluid.

20. The device of claim 19 wherein the expansible means is connected to and controlled by activating means below the wall surface in response of a sensor on a downstream shoulder of the microstep which detects the eddy current.

21. A method which comprises:
(a) providing a device which reduces skin friction drag caused by wall surface bounded turbulent shear flow of a fluid by controlling the flow characteristics within the wall surface bounded shear flow through interference with eddy current formation and interactions near the wall surface which comprises microsteps with a downstream facing face in the surface oriented across a mean flow direction along the wall surface and stepped down in the mean flow direction to a shoulder downstream of each of the microsteps, wherein a portion of the wall surface adjacent to at least some of the microsteps is adapted to inject a small but sufficient amount of fluid primarily in the mean flow direction of the fluid and wherein the injection is phased to the passage of pressure producing eddy currents just downstream of a point of injection of the fluid which eddy currents are detected by a detection means in the shoulder; and
(b) flowing the fluid over the surface in the mean flow direction while injecting the fluid wherein the microsteps reduce the drag.

* * * * *

UNITED STATES PATENT AND TRADEMARK OFFICE
CERTIFICATE OF CORRECTION

PATENT NO. : 5,133,519
DATED : July 28, 1992
INVENTOR(S) : Robert E. Falco

It is certified that error appears in the above—identified patent and that said Letters Patent is hereby corrected as shown below:

Title page, item [56], under "FOREIGN PATENT DOCUMENTS", "0205289 12/1989" should read --0205289 12/1986--.

Column 4, line 22, "fluid A" should be --fluid A'--.

Column 4, line 23, after "25," delete --o--.

Column 6, line 45, after "region" delete "o".

Column 7, line 2, after "region" delete "o".

Column 8, line 21, after "bounded" the following should be inserted --turbulent shear flow of a fluid by controlling the flow characteristics within the wall surface bounded--.

Signed and Sealed this

Fifth Day of October, 1993

Attest:

BRUCE LEHMAN

Attesting Officer

Commissioner of Patents and Trademarks